United States Patent
Seth et al.

(10) Patent No.: US 9,661,066 B2
(45) Date of Patent: May 23, 2017

(54) SYSTEM AND METHOD FOR ADDRESS BASED LOCATIONS

(71) Applicant: Yahoo! Inc., Sunnyvale, CA (US)

(72) Inventors: Abhishek Seth, Bangalore (IN); Mahendra Kumar, Karnataka (IN)

(73) Assignee: Yahoo! Inc., Sunnyvale, CA (US)

( * ) Notice: Subject to any disclaimer, the term of this patent is extended or adjusted under 35 U.S.C. 154(b) by 219 days.

(21) Appl. No.: 14/308,573

(22) Filed: Jun. 18, 2014

(65) Prior Publication Data
US 2015/0372966 A1    Dec. 24, 2015

(51) Int. Cl.
*H04L 29/08* (2006.01)
*H04W 4/02* (2009.01)
*H04L 29/12* (2006.01)

(52) U.S. Cl.
CPC .............. *H04L 67/10* (2013.01); *H04L 67/18* (2013.01); *H04W 4/021* (2013.01); *H04L 61/609* (2013.01)

(58) Field of Classification Search
CPC ..... H04L 61/106; H04L 61/609; H04L 67/10; H04L 67/18; H04W 4/021
See application file for complete search history.

(56) References Cited

U.S. PATENT DOCUMENTS

| | | | | |
|---|---|---|---|---|
| 7,298,327 B2* | 11/2007 | Dupray | ................... | G01S 1/026 342/451 |
| 9,026,145 B1* | 5/2015 | Duleba | ................... | H04L 61/25 455/456.3 |
| 2004/0068582 A1* | 4/2004 | Anderson | ......... | H04L 29/12009 709/245 |
| 2007/0015119 A1* | 1/2007 | Atenasio | ................. | G01C 21/20 434/130 |
| 2008/0021950 A1* | 1/2008 | Schirmacher | .......... | G06Q 30/02 709/201 |
| 2008/0288523 A1* | 11/2008 | Blose | .................. | G06F 17/3028 |
| 2011/0170547 A1* | 7/2011 | Fein | ...................... | H04L 45/126 370/392 |

FOREIGN PATENT DOCUMENTS

WO    WO 2012172160 A1 * 12/2012    ....... G06F 17/30241

* cited by examiner

*Primary Examiner* — Joe Chacko
(74) *Attorney, Agent, or Firm* — Hickman Palermo Becker Bingham LLP

(57) ABSTRACT

Techniques are provided for identifying a locations of application users based on originating address. Techniques to generate a set of address-to-location mappings include a system configured to receive information about a plurality of location-known requests that originated from an address, wherein the information indicates a plurality of locations for the originating address. The system is further configured to identify a geographical area based, at least in part, on the plurality of distinct locations; map the geographical area to a corresponding geographical locality; and associate the address to the geographical area and the corresponding geographical locality generating an address-to-location mapping. Address-to-location mappings may be further clustered into address-range-to-location mappings and stored as a data pack. Using these techniques, location information may be determined for a received location-unknown request that originated from a particular address.

28 Claims, 7 Drawing Sheets

SYSTEM AND METHOD FOR ADDRESS BASED LOCATIONS

FIELD OF THE DISCLOSURE

The present disclosure relates to determining locations for a location-unknown request based on an address.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Applications may increase the quality of user interactions if the applications have the ability to obtain locations of their users. An application that has access to the locations of its users is referred to herein as a location-aware application. In contrast, an application that does not have access to the locations of its users is referred to herein as a location-unaware application.

By knowing the locations of its users, a location-aware application may provide users with location-relevant information. For example, a news provider application that serves up news about events in the city/state of a user will generate more demand for its content than a location-unaware application that serves up news about other cities/states.

In another example, some products may have a "location context". A "location context" of a product refers to the notion that the location of a user may be a factor in the user's interest in the product. For example, heavy coats have a "location context" in that they will generally have higher appeal to users that reside in cold climates. Similarly, advertisements about a restaurant that is only located in a particular city may have higher appeal to users in that city than to users that reside elsewhere.

If an advertised product has a location context, then users outside of the location context may not be interested in hearing about the product. For example, a location-unaware application may advertise a heavy coat to its users in Hawaii, and therefore, generate low response rate to the advertisement from those users. On the other hand, if the application would advertise beach t-shirts to its users in Hawaii, then the response rate to the advertisement would likely be much higher. Thus, location-unaware applications that do not provide location-relevant information to users may experience loss in their user base or their revenues from sources such as advertising.

According to one solution for providing location-relevant information, an application may request its users to enter information about their location. If a user provides locations for the application to use, then the application thereby becomes a location-aware application that can provide location-relevant information. However, a user may decline to enter such information. For example, if an application requests users to enter location information for targeting location-relevant advertisements, many users may decline such requests or provide inaccurate location information. Even when users initially provide accurate location information, users may fail to update their location information when their location changes.

An application may also attempt to extract user location information from user's accessing device. For example, an application may attempt to retrieve GPS data from user's device. If successful, the application thereby becomes a location-aware application that is able to provide location-relevant information. However, a user's privacy restrictions may prevent the application from accessing such information. Thus, the application may have no locations, or an incomplete set of locations.

Another solution for location-unaware applications to provide location-relevant information is to extract user location information from third-party databases. Third-party databases generally contain address-to-location mappings that reflect a snapshot of the mappings that are generally provided by Internet Service Providers (ISP). ISPs assign addresses to their customers and map those addresses to customer location information. However, ISPs regularly re-assign addresses based on ISP requirements, and thus, the databases that the third parties provide tend to contain out-of-date information and require regular updates. Accordingly, the third-party databases may provide low accuracy for mapping user address to locations. In many instances, the accuracy may be less than 50%. Using such low accuracy address-to-location mappings, location-unaware applications may frequently provide inaccurate location-relevant data to users.

BRIEF DESCRIPTION OF THE DRAWINGS

In the drawings of certain embodiments in which like reference numerals refer to corresponding parts throughout the figures.

DETAILED DESCRIPTION

Figure 1:
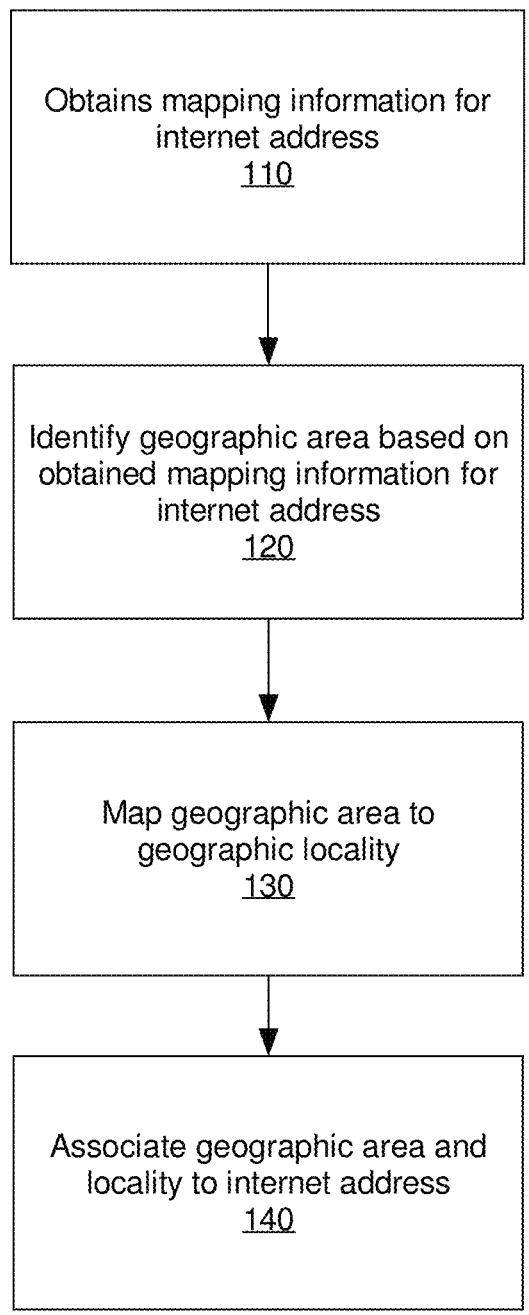
FIG. 1 is a flow diagram that depicts a process for generating address-to-location mappings by an AGS, according to an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Location-Unknown Requests

A location-unknown request is a request that includes a network address but does not include locations. The address included in the location-unknown request may be any address that is currently being used by the computing device from which the location-unknown request was sent. The address may be physically assigned to the computing device, such as a MAC address of a network interface connected to the Internet, or logically assigned to the computing device (by an ISP, the computer system itself, or another entity), such as an Internet Protocol (IP) address.

Embodiments described herein use an Internet Protocol version 4 (IPv4) address format for addresses. However, the techniques described herein may alternatively use other formats of addresses, such as Internet Protocol version 6 (IPv6) address or MAC address or any combination of these or other address formats.

Location-Known Requests

Unlike a location-unknown request, a location-known request is a request that indicates both a network address and locations. Typically, the location-known requests used to create the address-to-location mappings come from users of location-aware applications, while the location-unknown requests come from users of location-unaware applications. For example, locations obtained from location-aware applications that do have permission to access the user's location may be used to determine the correct locations to use to process requests from location-unaware applications that do not have permission to access the user's location information.

General Overview

As used herein, "locations" refers to any information used to indicate a geographic location of a user, or a computing device being used by the user. The locations may identify a geographic location, for example, by name, by a geographic coordinate system, and/or by geographic address. Locations may identify a geographic locality such as city, state, postal zip code; or geographic area, such as an area bounded by a set of geographic coordinates; or a geographic point represented by geographic coordinates. Although, the embodiments described herein use longitude and latitude for geographic coordinates, any number of geographic coordinate systems may be used, such as Cartesian coordinate system, stereographic coordinate system or any combination of these or other geographic coordinate systems.

As mentioned above, location-unaware applications are not able to obtain locations directly from a user or the user's computing device. Techniques are described hereafter in which location-unaware applications may issue "location-unknown" requests to an address geolocation system (AGS). A location-unknown request is a request that includes a network address but does not include the locations of the user/device that submitted the request. Based on the network address indicated in a location-unknown request, the AGS responds with locations determined for the address. Based on the locations obtained from the AGS, location-unaware applications may provide location-relevant information.

Mapping Information Sources

Mapping information may be derived from location-known requests to location-aware applications or from other mapping information sources. The term "mapping information" refers to information that contains one or more mappings of addresses to locations. The mapping information may further include other information, such as a timestamp associated with the time when the corresponding locations and address were collected.

The various sources from which mapping information may be derived are collectively referred herein as "mapping information sources." The exact mapping information source, or combination of mapping information sources, from which address-to-location mappings are derived is not critical to the techniques described herein.

The mapping information may be obtained in a variety of ways from mapping information sources. For example, an address geolocation system may send a request for mapping information to mapping information sources such as location-aware applications 201 and 203, or mapping information sources may push the mapping information to the address geolocation system. Once mapping information is obtained, the system may convert the obtained mapping information into a data format that can be processed by the system.

As mentioned above, a location-aware application has the ability to provide locations. An example of a location-aware application is an application where a user voluntarily enters her location information. As another example, a location-aware application can retrieve user locations automatically through triangulation or GPS. For example, a user may have used a weather application on her device, where the user entered her postal code information to retrieve weather information for the location of the user. The weather application may have recorded the postal code along with the user's device network address. The same user may have also used a mapping application on the same device, and the mapping application might have had the permission to extract the GPS coordinates. The mapping application may have saved the GPS coordinates of the user device along with the network address of the device. The AGS then might have obtained this mapping information from the weather and mapping applications.

"Source databases", may also provide information from which address-to-location mappings may be derived. Examples of source databases include databases, maintained by ISPs, that indicate address assignments to users in known locations. Another source of information from which address-to-location mappings may be derived is a log file of a location-aware application. Such a log file may include entries that correspond to location-known requests from users of the location-aware application. The entry for a particular location-known request may indicate, among other things, (a) the network address from which the corresponding request originated, and (b) the locations associated with the request.

Functional Overview

FIG. 1 is a flow diagram that depicts a process for an AGS to obtain locations for a specific network address based on information obtained from "location-known" requests involving that specific address, according to an embodiment.

At block 110, the system obtains mapping information for the specific address based on location-known requests that are associated with that specific address. For the purpose of explanation, it shall be assumed that the specific address is ADDR1, and that a location-aware application has received five location-known requests associated with ADDR1. It shall further be assumed that those five location-known requests were issued from locations L1, L2, L3, L4 and L5, respectively.

Based on this mapping information for ADDR1, a geographic area for ADDR1 is identified at block 120. In the example given above, the geographic area determined at block 120 for ADDR1 may be the geographic area bounded by the coordinates L1, L2, L3, L4 and L5. Alternatively, the geographic area determined for ADDR1 may be the geographic area bounded by a subset of the five locations L1, L2, L3, L4 and L5. For example, the geographic area determined for ADDR1 may be the geographic area bounded by L1, L3 and L4, where the locations L2 and L5 are excluded because they have been determined to be outliers.

At block 130, the identified geographic area is then mapped to a geographic locality. For example, the geographic area bounded by L1, L3 and L4 may be mapped to the city "Atlanta, Ga.". The geographic locality thus determined is then associated with the address at block 140. Thus, the address-to-location mapping that maps ADDR1 to "Atlanta, Ga." would be created. In this example, "Atlanta, Ga." constitutes locations that is mapped to ADDR1.

Although the embodiment depicted in FIG. 1 describes the process for generation of address-to-location mappings for a specific address, the same process may be repeated for any number of addresses in an embodiment.

Address Geolocation System (AGS)

Figure 2:
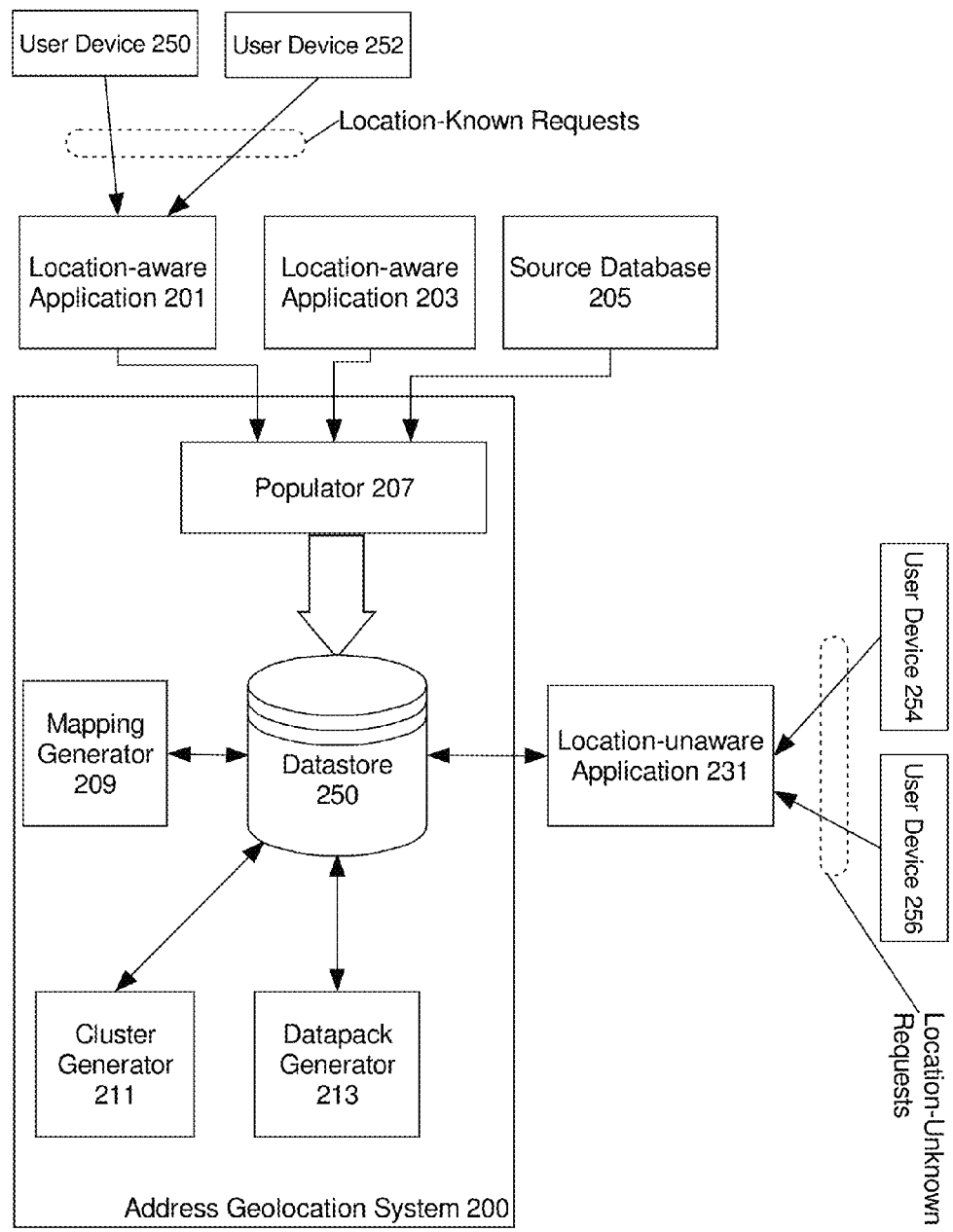
FIG. 2 is a system diagram that depicts address geolocation system (AGS), according to an embodiment.

FIG. 2 is a system diagram that depicts an address geolocation system (AGS 200), in an embodiment. AGS 200 may be used to derive mapping information based on information obtained from mapping information sources such as location-aware application 201, location-aware application 203, or source database 205. Location-aware application 201 may be an application where a user voluntarily enters her location information. Location-aware application 203 may be an application that can retrieve locations automatically through triangulation or GPS.

As mentioned above, location-aware applications receive location-known requests that include locations. As is typical with all requests issued over a network, location-known requests also include the network address currently assigned to the computing device that issued the request. In FIG. 2, location-aware application 201 is receiving location-known requests from user devices 250 and 252. The location-known requests from user device 250 indicate the address currently assigned to user device 250 as well as locations that indicates the current location of user device 250. Similarly, the location-known requests from user device 252 indicate the address currently assigned to user device 252 as well as locations that indicates the current location of user device 252.

AGS 200 includes a populator 207, a mapping generator 209, a cluster generator 211, a datapack generator 213 and a datastore 250. Populator 207 generally represents a mechanism that obtains information from mapping information sources, in an embodiment. The mapping information may be periodically pulled from mapping information sources by populator 207. In addition or in the alternative, mapping information may be pushed to populator 207 periodically by mapping information sources.

In the pull scenario, populator 207 may request mapping information periodically from mapping information sources. The period may vary depending on the capacity of datastore 250 and the latency in processing the data by AGS 200, in general.

In the push scenario, location-aware applications, such as location-aware applications 201 and 203, may send mapping information periodically. In one embodiment, location-aware applications 201 and 203 send mapping information to populator 207 every time a location-known request is received from a user.

Populator 207 may also receive mapping information by querying or importing source databases, such as source database 205.

In an embodiment, populator 207 may receive mapping information in different data formats. Mapping information sources may retain the location information in various formats. For example, such data format may be in XML format with different XML schemas, in name-value pair format, in a proprietary or standard data structure or in a database table. Since every mapping information source may have its own data format for mapping information, populator 207 converts the obtained mapping information into a particular data format and stores the converted mapping information in datastore 250. The particular format may depend on the format defined in datastore 250 for storing location-known request information. In a related embodiment, mapping information sources may be aware of the particular format and may directly store the mapping information in the particular format in the datastore 250, thus bypassing populator 207.

Mapping generator 209 generally represents a mechanism programmed to retrieve mapping information from datastore 250, to analyze the mapping information, and to generate address-to-location mappings based on the mapping information, in an embodiment. The retrieval of mapping information from datastore 250 may be periodic or request based, as described in further detail hereafter.

Mapping generator 209 analyzes the retrieved mapping information to identify a common geographic area for one or more network addresses. The identification of a common geographic area for one or more network addresses is described in greater detail hereafter. In one embodiment, once geographic area is identified, mapping generator 209 maps the geographic area to a known geographic locality. For example, mapping generator 209 may map the geographic area encompassed by a set of GPS coordinates to a particular state, county or city. Mapping generator 209 may then store into datastore 250 address-to-location mappings that map the one or more addresses to the identified state, county or city.

Cluster generator 211 may retrieve the address-to-location mappings and consolidate them according to addresses and locations. Cluster generator 211 evaluates the locations of substantially contiguous addresses from the address-to-location mappings. When the locations of substantially contiguous addresses approximately match, cluster generator 211 may combine the substantially contiguous addresses into an address range and map that address range to the same locations. Thus, cluster generator 211 may generate an address-range-to-location mapping for the address range. Cluster generator 211 may then store address-range-to-location mappings to datastore 250.

Datapack generator 213 generally represents a mechanism programmed to retrieve address-range-to-location mappings and store the mappings back in datastore 250 in a particular format, in an embodiment. The particular format may be designed to speed the access to the address-range-to-location mappings by location-unaware applications. A particular format that may be used by datapack generator 213, according to one embodiment, is described in further detail hereafter.

Datastore 250 may receive location-queries from consumers such as location-unaware application 231, and may provide locations for addresses, in an embodiment. As used herein, "location-query" is a query for user-location-information based one or more addresses. Typically, the addresses for which location-queries are issued are the addresses associated with location-unknown requests. For example, location-unaware application 231 may send a location-query to datastore 250 for addresses associated with location-unknown requests received by location-unaware application 231.

Location-unaware application 231 may, for example, receive location-unknown requests from user devices 254 and 256. To provide users of user devices 254 and 256 with location-relevant information, location-unaware application may parse location-unknown requests from user devices 254 and 256 to retrieve the corresponding network addresses, and use the network addresses to construct location-queries to send to datastore 250. In response to receiving a location-query, Datastore 250 selects the locations from the stored address-range-to-location mappings that corresponds to the addresses, and sends the user-location information to location-unaware application 231. Location-unaware application may then provide location-relevant information in response to the original location-unknown requests of users from user devices 254 and 256 based on the received locations.

Each of populator 207, mapping generator 209, cluster generator 211, datapack generator 213 and datastore 250 are part of computer system and may be implemented in software, hardware, or a combination of software and hardware. For example, one or more of populator 207, mapping generator 209, cluster generator 211, datapack generator 213 and datastore 250 may be implemented using stored program logic.

Processing Mapping Information

Figure 3:
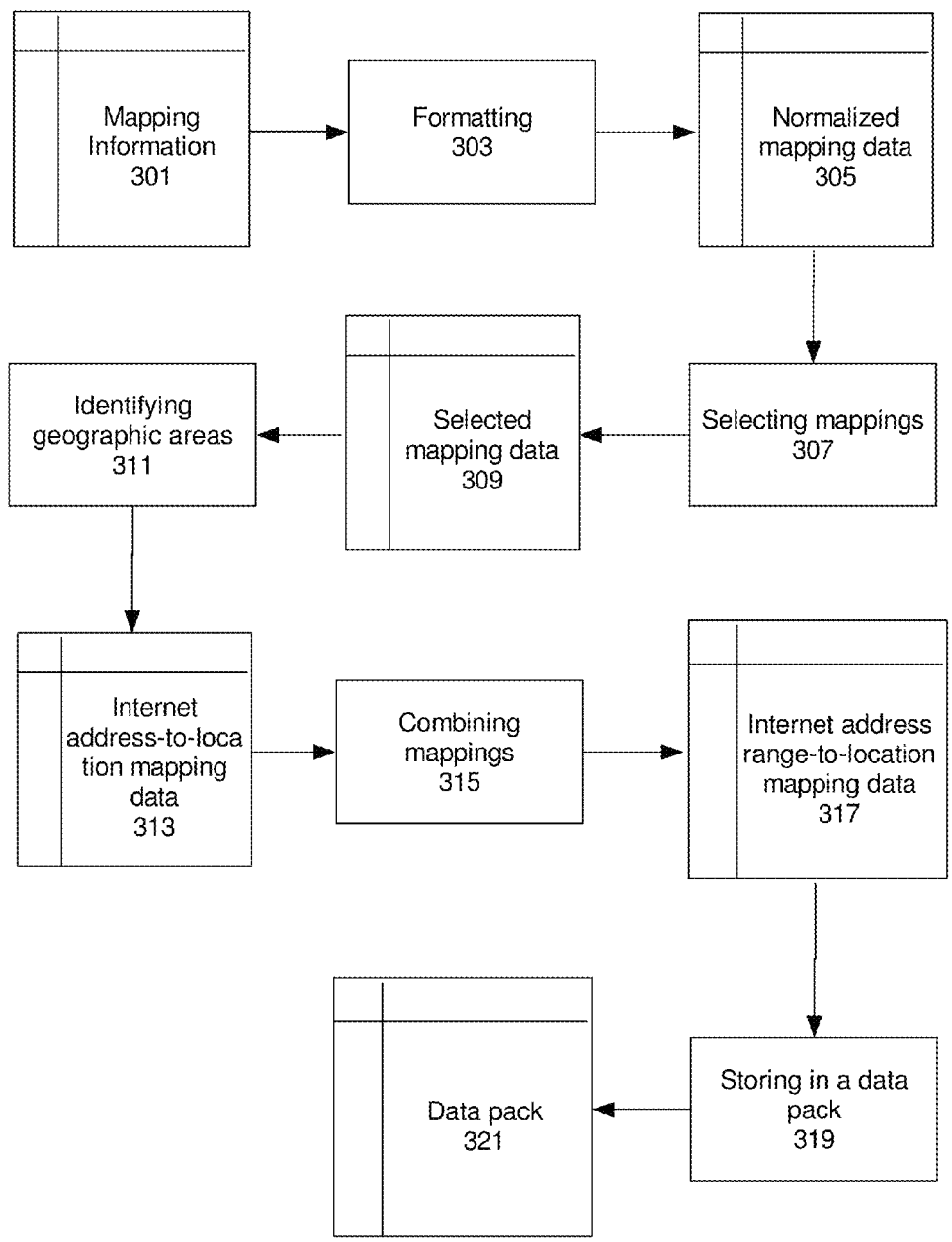
FIG. 3 is a process diagram that depicts program logic for generating a data pack of address-range-to-location mappings, according to an embodiment.

FIG. 3 is a process diagram that depicts program logic for processing mapping information into a data pack of address-range-to-location mappings for locations retrieval in response to location-queries, in an embodiment. In step 303, mapping information 301 is obtained and formatted into a particular format. Although specifying substantially the same information, mapping information 301 may be obtained in many different formats. In step 303, the different formats may be converted into a particular format, thereby producing normalized mapping data 305.

For example, the particular format of normalized mapping data 305 may reflect a certain database schema for tables that store the mapping data, or a particular schema for an INI file with the mapping data, or a particular XML schema for XML file containing the mapping data. However, the exact format used to store the normalized mapping data is not critical to the techniques described herein.

In a related embodiment, populator 207 may perform step 303. Populator 207 may format the obtained mapping information 301 into normalized mapping data 305. Then, populator 207 may store normalized mapping data 305 into datastore 250 in a particular format.

AGS may obtain and normalize mapping information for many network addresses. However, a portion of network addresses may not have enough mapping information for AGS to accurately determine locations. Thus, AGS may select only a subset of normalized mapping data for further processing, in step 307. The criteria used to perform the selection is referred to herein as the "mapping data selection criteria". The mapping data that is selected based on the mapping data selection criteria is shown as selected mapping data 309. According to one embodiment, the mapping data selection criteria selects the mapping data for those addresses that have a statistically relevant number of locations mappings in the normalized mapping data 305.

In one embodiment, selection is based, at least in part, on an observation time period. For example, using the timestamp information in normalized mapping data 305, only those mappings are retrieved that have timestamps that fall within the observation time period. From the retrieved mappings, only those mappings are selected into selected mapping data 309 that have an address that appears more than a preconfigured number of times within the retrieved mappings. For example, selected mapping data 309 may contain mappings for each address where:

the mappings for the particular address have timestamps that are within the past five days, and
there are at least ten of such mappings for the particular address.

In the foregoing example, the observation period is the past five days, and the preconfigured number is ten.

In another embodiment, selected mapping data 309 may contain mappings for each address where mappings for the address have timestamps that fall within a preconfigured number of different time periods. For example, mappings for a particular mapping address are selected from normalized mapping data 305, when mappings for the address have timestamps of at least five different days.

In a related embodiment, normalized mapping data 305 is stored in datastore 250. Mapping generator 209 selects selected mapping data 309 from normalized mapping data 305 from datastore 250. The selecting may be accomplished through a database query, or XPATH query or parsing an input stream. However, the exact method used to select selected mapping data 309 from normalized mapping data 305 is not critical to the techniques described herein.

The selected mapping data 309 may have the same address mapped to multiple locations. In the example mentioned above, ADDR1 was mapped to five locations L1, L2, L3, L4 and L4. In step 311, each such address is mapped to a single geographic area based on the information that selected mapping data 309 has for the address. However, when determining the geographic area, it may be necessary to exclude from consideration some of the locations to which ADDR1 is mapped, as "outlier locations." How "outlier locations" are identified shall be described in greater detail hereafter. The identified geographic area may then be mapped to a known geographic locality that corresponds to the identified geographic area, in an embodiment.

Thus, a geographic area and locality may be identified and mapped to each address in selected mapping data 309 to generate address-to-location mapping data 313, in an embodiment. In a related embodiment, mapping generator 209 may execute step 311 for identifying geographic areas and generating address-to-location mapping data 313 which may then be stored in datastore 250.

Identifying Outlier Locations

According to one embodiment, the system statistically determines outlier locations for a particular address from the mapping information. When statistically significant number of locations has been obtained for a particular address from mapping information, AGS may calculate variances of locations that are mapped to a particular address, and determine which of the locations qualify as outliers.

In general, an "outlier location", also referred herein as "outlier", is a location that has greater statistical variance than other locations mapped to the same particular address. For example, when a significant number of mappings for a particular address are grouped in a particular geographic area (e.g. ADDR1 is mapped to coordinates in Atlanta in over 200 location-known requests) while the same address is mapped to another location very few times (e.g. ADDR1 is mapped to coordinates in New York in 2 location-known requests), then the locations in the low-frequency mappings are considered outliers. The locations that are not outliers are non-outlier locations, also referred herein as "non-outliers."

Figure 4:
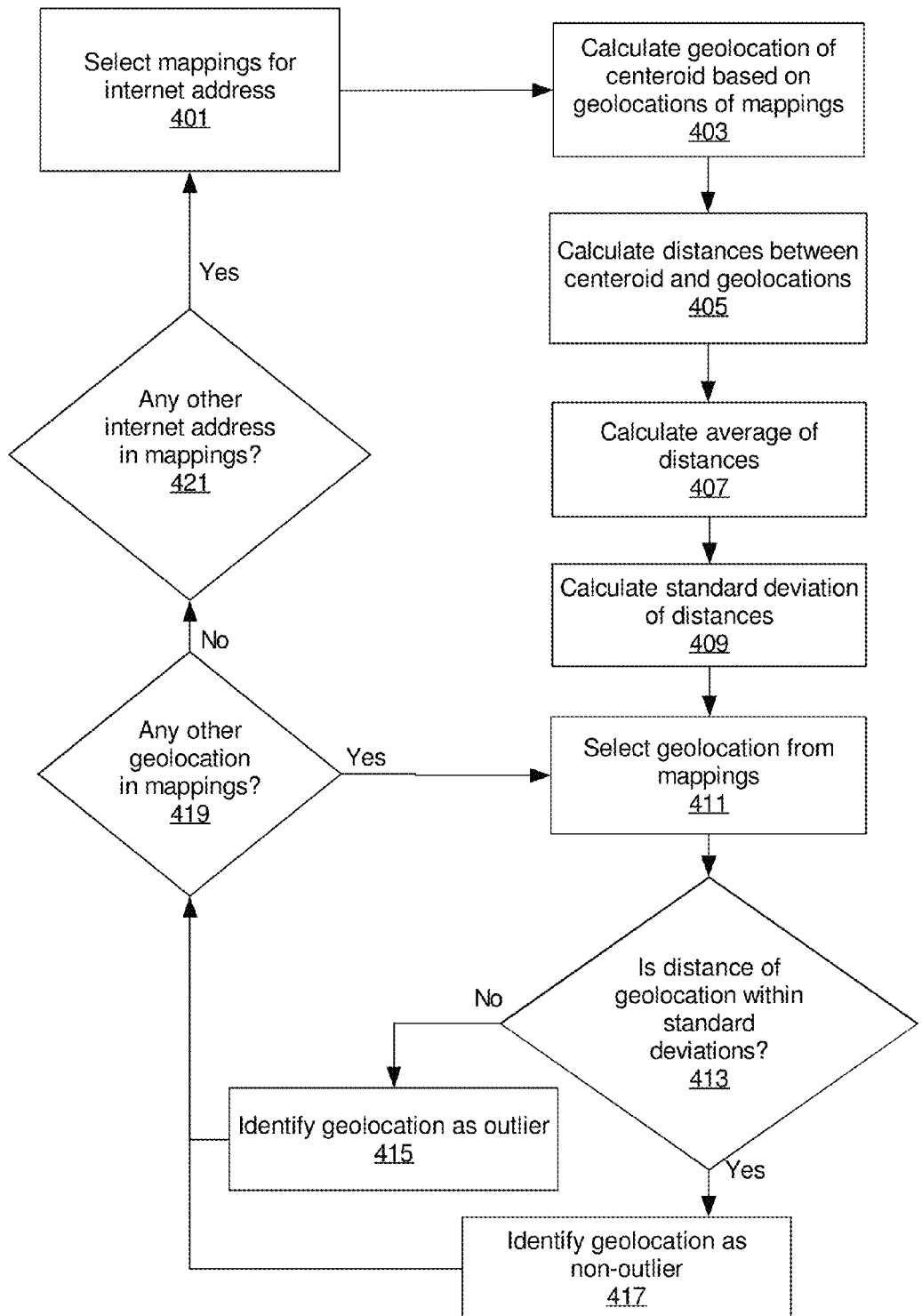
FIG. 4 is a flow diagram that depicts a process for identifying outliers, according to an embodiment.

FIG. 4 is a flow diagram that depicts a process for identifying outliers, in an embodiment. At block 401, mappings that contain locations for a particular address are selected from mapping data. Based on the locations in the selected mapping data, a centroid location is calculated at block 403. The latitude coordinate of the centroid location may be calculated by averaging the latitude coordinates of the selected locations, and similarly, the longitude coordinate of the centroid location may be calculated by averaging the longitude coordinates of the selected locations. At block 405, distances between the selected locations and the centroid are calculated. The mean distance of the distances is calculated at block 407, and the standard deviation of the distances is calculated at block 409.

Each location in the selected mapping data may then be selected at block 411. At block 413, the distance of the selected locations is evaluated against the mean distance. If the distance is within a number of standard deviations of the mean distance, then, at block 417, the selected locations is identified as a non-outlier. Otherwise, at block 415, the selected location is identified as an outlier. In a related embodiment, a selected location that is within three standard deviations of the mean distance is identified as a non-outlier, otherwise the selected location is identified as an outlier.

At block 419, the steps 411 through 417 may be repeated for all the locations that are mapped to the particular address in the selected mapping data, thus classifying the locations that map to the address as outliers and non-outliers. At block 421, the steps 401 through 419 may be repeated for all addresses in the selected mapping data 309.

Example of Determining a Geographic Locality for an Address

Figure 5:
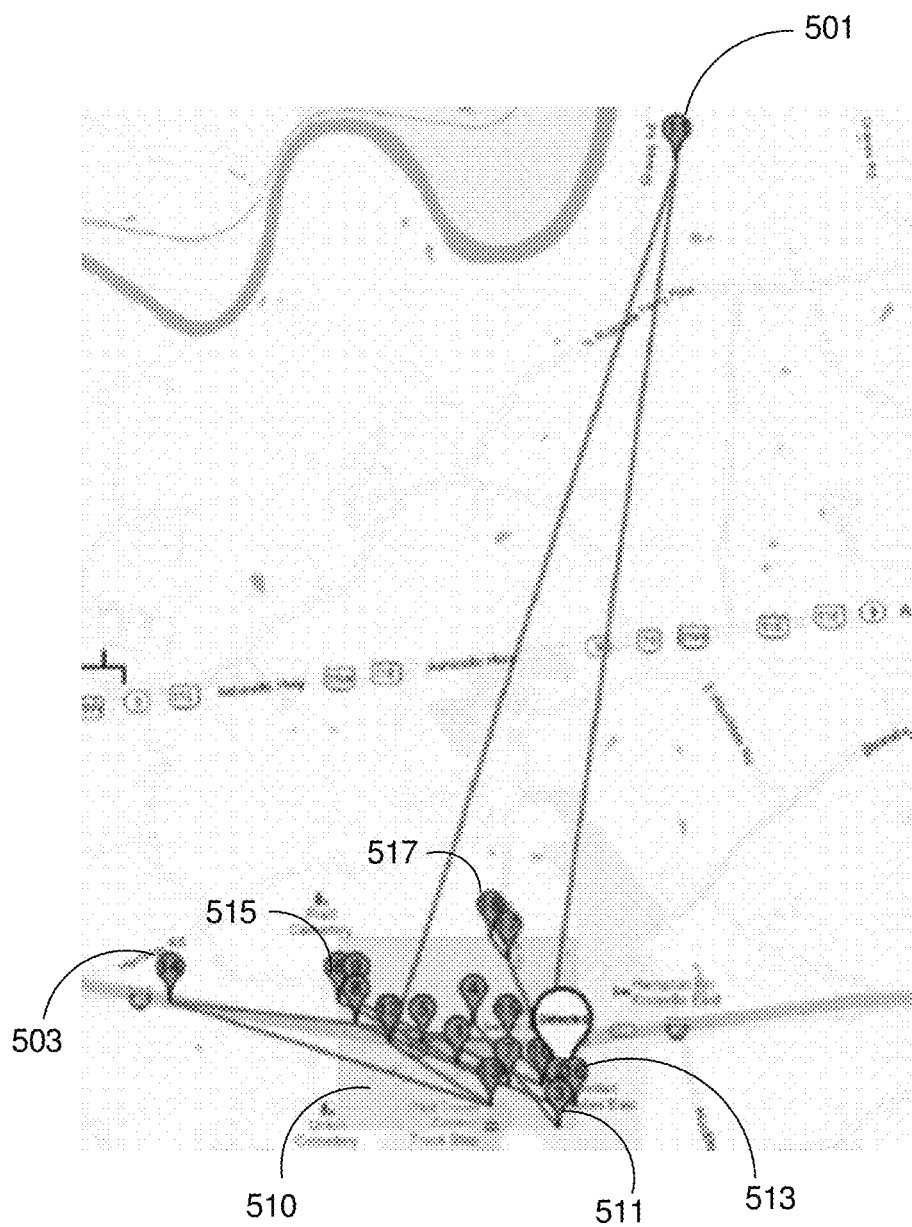
FIG. 5 depicts a map of locations for a particular address, according to an embodiment.

FIG. 5 depicts a map of locations for a particular address, in an embodiment. Locations 501, 503, 511, 513, 515, 517 may correspond to a particular address from mapping data. In an embodiment, based on the steps described in FIG. 4, locations 501, 503 are identified as outliers, while locations 511, 513, 515, 517 are identified as non-outliers for the particular address.

Based on locations that are identified as non-outliers for a particular address, a geographic area may be identified that includes the non-outlier locations, in an embodiment. The geographic area may be the area bounded by the non-outlier locations. In the example illustrated in FIG. 5, shaded area 510 is a geographic area that encompasses all non-outlier locations for a particular address. Geographic area 510 may be determined by a rectangle that is bounded by the minimum longitude coordinate of the non-outlier locations on one side (location 515), the maximum longitude coordinate of the non-outlier locations on the other side (location 513), the minimum latitude coordinate of the non-outlier locations on the third side (locations 511), and the maximum latitude coordinate of the non-outlier locations on the fourth side (locations 517).

In a related embodiment, a geographic area for a particular address may be determined by polygonal of peripheral non-outlier locations for the particular address. The peripheral non-outlier locations may be identified by sorting the locations for the particular address based on their longitude and latitude coordinates. Then, the geographic area may be identified by connecting all the peripheral non-outlier locations.

In another related embodiment, a geographic area for a particular address may be determined by a circle with a centroid as the center. The non-outlier location that has the furthest distance from the centroid may be first identified. Then, the geographic area may be identified by a circular geographic area with the centroid location at its center and with a radius equal to the furthest distance.

Other embodiments are also envisioned that use different methods for identifying a geographic area for a particular address based on non-outlier locations for the particular address. Such embodiments may include differently shaped geographic areas or use different geographic coordinate system.

An identified geographic area for a particular address may then be mapped to a known geographic locality, in an embodiment. The geographic locality may be mapped based on proximity to the identified geographic area, or coverage of the identified geographic area of the geographic locality. For example, if an address is mapped to a geographic area that falls mostly within the boundaries of particular city, then the address may be mapped to the particular city. The granularity of the locality to which an address is mapped may vary based on a variety of factors, including the size of the geographic area. For example, an address that maps to a small geographic area may be mapped to a city, while an address that maps to a larger geographic area may be mapped to a county.

Further, even when an address maps to a single geographic area, the address may be mapped to multiple localities. For example, if an address maps to an area that covers two adjacent cities, the address may be treated as being mapped to both of the two cities.

Address Clustering

After generating address-to-location mappings, AGS may cluster addresses based on the proximity of addresses and the proximity of their corresponding locations in address-to-location mappings, in an embodiment. The clustering combines one or more proximate addresses from address-to-location mappings into an address range, when the corresponding locations from the address-to-location mappings are determined to be proximate. The proximate locations are also combined and mapped to the address range, thus generating an address-range-to-location mapping. An address range may be denoted by a range of addresses or by an address subnet. In a related embodiment, internet subnet may be an IPv4 or an IPv6 subnet. IPv4 or IPv6 subnets may be designated by the number of most significant bits in the address range that is unchanged for all addresses within a subnet or range. For example, an IPv4 subnet of 38.104.134.176/28 denotes 38.104.134.176-191 range of addresses.

In FIG. 3, address-range-to-location mapping data 317 may be generated by combining address-to-location mappings from address-to-location mapping data 313, in an embodiment. Two or more addresses from address-to-location mapping data 313 that commonly share a portion of address may be combined to form an address range. In a related embodiment, such shared portion may be a common address subnet, and thus, the formed address range may correspond to an address subnet of the combined addresses.

The two or more addresses may be combined, if the corresponding locations have proximate or overlapping geographic areas, in an embodiment. Criteria used for proximity and overlap may vary and may be configurable. For example, criteria for proximity or overlap may be represented in coordinate degree difference between geographic areas or their centroids, or in units of distance between geographic areas or their corresponding centroids. However, the exact criteria or representation of criteria is not critical to the techniques described herein.

Table 1 describes four address-to-location mappings that may be combined, in an embodiment. "Address" column denotes addresses of the address-to-location mappings. "Geographic Area" column denotes the geographic area for each address areas in latitude and longitude coordinate ranges. "Geographic Locality" column denotes known geographic locality that corresponds to the geographic areas in "Geographic Area" column.

TABLE 1

Address-to-Location Mappings

| Address | Geographic Area | Geographic Locality |
|---|---|---|
| 38.104.134.176 | latitude: 37.3334 to 37.3338 longitude: −121.8951 to −121.8950 | San Jose, CA |
| 38.104.134.185 | latitude: 37.3330 to 37.3334 longitude: −121.8952 to −121.8949 | San Jose, CA |
| 38.104.134.187 | latitude: 37.3310 to 37.3330 longitude: −121.8952 to −121.8949 | San Jose, CA |
| 38.104.134.190 | latitude: 37.3333 to 37.3335 longitude: −121.8950 to −121.8948 | San Jose, CA |

The geographic areas in Table 1 are in proximity of one another based on comparison of the lower and upper bounds of the latitude and longitude coordinates for the geographic areas. For example, the greatest difference in lower bounds of latitude is 0.0024 degrees (difference between 37.3334 and 37.3310). If this difference, along with other similarly calculated bound differences meet the criteria for proximity, then the address corresponding to the proximate geographic areas may be combined into an address range.

Addresses may be combined based on a common portion of the addresses, in an embodiment. The addresses in Table 1 share "38.104.134" portion and may be combined based on this portion. The resultant IP range may be represented by address range of 38.104.134.0-255 or by the corresponding subnet, 38.104.134.0/24.

In a related embodiment, addresses may be combined based on a range from the lowest address to the highest address. In such embodiment, the addresses in Table 1 may be combined into an address range of 38.104.134.176-38.104.134.190 or 38.104.134.176-190.

In yet another related embodiment, addresses may be combined based on bitwise operation on the addresses to yield the corresponding address range. The bitwise AND operation on addresses may yield the precise subnet for the address range that the addresses belong to. For example, bitwise AND of the addresses in Table 1 yields 38.104.134.176. Thus, the corresponding address range may be denoted as 38.104.134.176-191 or as a subnet, 38.104.134.176/28.

Locations for an address range may be determined based on geographic areas of addresses within the address range, in an embodiment. For example, the minimum of lower bound latitude coordinates of geographic areas for the addresses in an address range may yield the lower bound latitude coordinate for the geographic area of the address range. Similarly, the maximum of upper bound latitude coordinates may yield the upper bound latitude coordinate for the address range's geographic area; the minimum of lower bound longitude coordinates may yield the lower bound longitude coordinate; and the maximum of upper bound longitude coordinates may yield the upper bound longitude coordinate. Accordingly, the geographic area for the address range of Table 1 address may be represented by latitude: 37.3310 to 37.3338 and longitude: −121.8952 to −121.8948.

Figure 6:
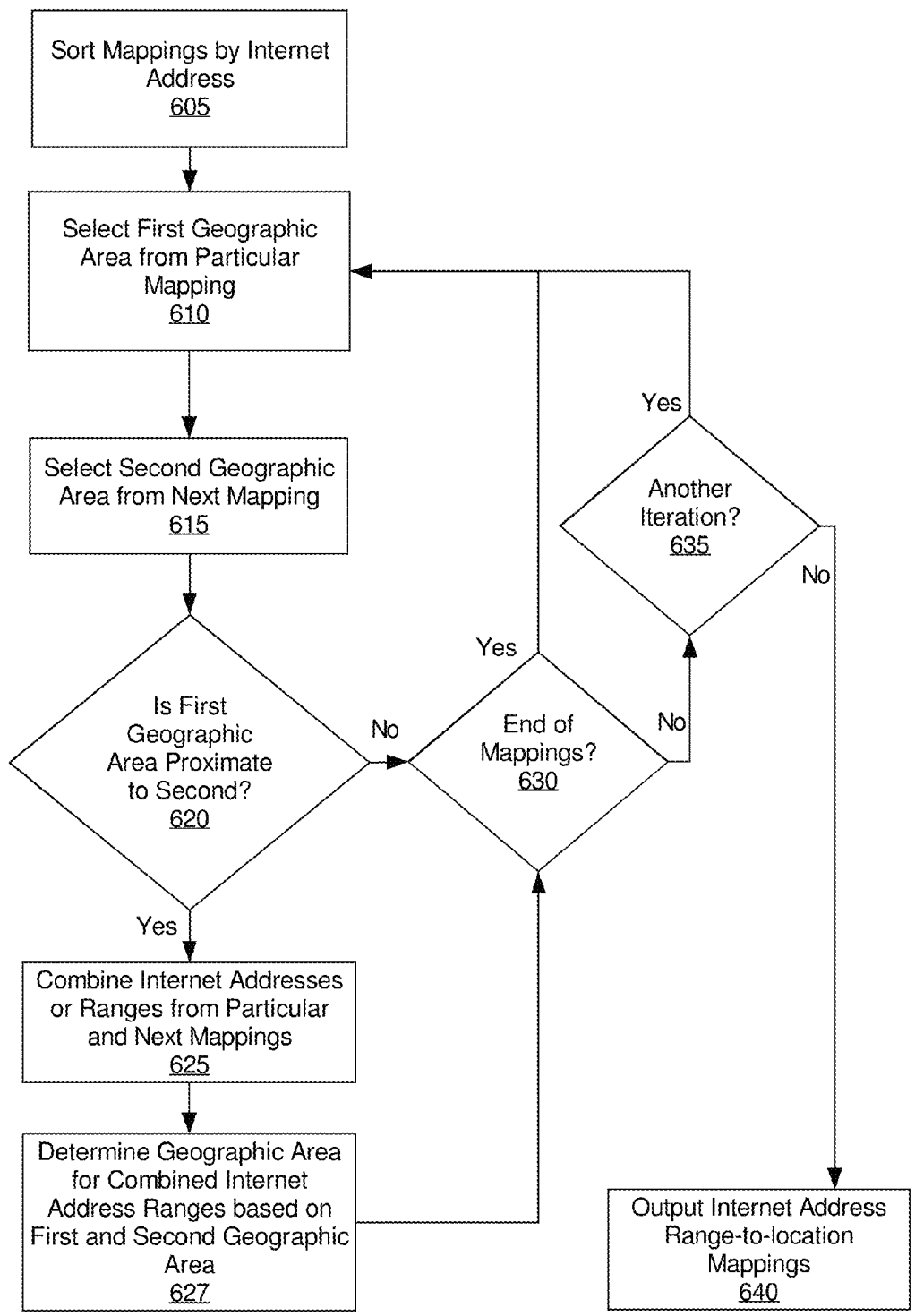
FIG. 6 is a flow diagram that depicts clustering address-to-location mappings for generating address-range-to-location mappings, according to an embodiment.

FIG. 6 is a flow diagram that depicts clustering address-to-location mappings for generating address-range-to-location mappings, in an embodiment. At block 605, address-to-location mappings are sorted by addresses. In a first iteration at block 610, a first geographic area of a particular mapping is selected. At block 615, a second geographic area of the next mapping after the particular mapping is selected. The first geographic area and the second geographic area may be compared for proximity at block 620. If the first geographic area is determined to be proximate to the second geographic area, then, at block 625, the address from the particular mapping is combined with the address from the next mapping to generate an address range. At block 627, a new geographic area is determined based on the geographic area of the particular mapping and the geographic area of the next mapping.

However, if the geographic areas are not proximate, then the process proceeds to block 630 to determine whether other address-to-location mappings need to be evaluated, and if so, selects the subsequent mapping to execute the steps at block 610 through 627. After mappings in the address-to-location mappings have been evaluated at least once, address-range-to-location mappings may be generated at block 640.

However, address-range-to-location mappings may be further combined through additional iterations of the process depicted in FIG. 6, in an embodiment. If at block 635, the process proceeds to block 610, then through executing blocks 610 through 630, address-range-to-location mappings are further combined and outputted at block 640. For example, address-to-location mappings in Table 1 may be combined using the flow diagram depicted in FIG. 6, where the first iteration would yield address-range-to-location mappings described in Table 2.

TABLE 2

Address-range-to-Location Mappings

| Address | Geographic Area | Geographic Locality |
|---|---|---|
| 38.104.134.176-185 | latitude: 37.3330 to 37.3338 longitude: −121.8952 to −121.8949 | San Jose, CA |
| 38.104.134.187-190 | latitude: 37.3310 to 37.3335 longitude: −121.8952 to −121.8948 | San Jose, CA |

In an embodiment, after another iteration of the process depicted in FIG. 6, the address-range-to-location mappings may be further combined generating a new address-range-to-location mapping. The address ranges in Table 2, 38.104.134.176-185 and 38.104.134.187-190, are combined at block 625 to yield new address range 38.104.134.176-190. The new geographic are for the range is determined by calculating the corresponding minimums of lower bounds and maximums of upper bounds of the geographic areas in Table 2. Thus, the resulting geographic area for the address range is latitude: 37.3310 to 37.3338 and longitude: −121.8952 to −121.8948; and geographic locality is San Jose, Calif.

Data Pack

Address-range-to-location mappings from address-range-to-location mapping data 317 may be stored in step 319 of FIG. 3 in data pack 321, in an embodiment. To provide for a fast retrieval of address-range-to-location mappings, a data pack may store the range portion of an address range separate from the non-range portion. The range portion may be stored in a data table of the data pack along locations, while the non-range portion may be stored in an index table that provides a pointer information to the data table. In addition to having a column for non-range portion, the index table may further consist of one or more columns that contain pointer information to the data table. In a related embodiment, the pointer information may include index into the data table to identify all range portions that correspond to the non-range portion of an address range and may further include row count identifying number of rows in the data table for the corresponding non-range portions.

Table 3 and Table 4 describe an embodiment of an index table and a data table, respectively. Index Table, Table 3 stores non-range portions of addresses in "Subnet Address" column. To retrieve geographic areas and geographic localities for address ranges, Index Table also stores pointer information to Data Table, Table 4, to facilitate the retrieval of the mappings. "Data Table Index" column of Index Table identifies index values that match "Index" column values in Data Table. "Row Count" column of Index Table identifies number of rows in Data Table that contain range portions for non-range portions of address ranges. "Geographic Area" and "Geographic Locality" columns of Data Table identify, respectively, geographic areas and geographic localities for address ranges specified in "Range" column of Data Table and "Subnet Address" column of Index Table. "Subnet Address" column and "Range" column are matched through "Index" column of Data Table and "Data Table Index" column of Index Table.

TABLE 3

Index Table

| Subnet Address | Data Table Index | Row Count |
| --- | --- | --- |
| . . . | | |
| 38.104.134 | 12345 | 4 |
| 38.104.135 | 12346 | 2 |
| . . . | | |

TABLE 4

Data Table

| Index | Range | Geographic Area | Geographic Locality |
| --- | --- | --- | --- |
| . . . | | | |
| 12345 | 1-127 | latitude: 37.406 to 37.42 longitude: −122.03 to −122.02 | Sunnyvale, CA |
| 12345 | 128-175 | latitude: 37.344 to 37.355 longitude: −121.946 to −121.931 | Santa Clara, CA |
| 12345 | 176-190 | latitude: 37.3310 to 37.3338 longitude: −121.8952 to −121.8948 | 95128 |
| 12345 | 191-255 | latitude: 37.282 to 37.294 longitude: −121.945 to −121.940 | Campbell, CA |
| 12346 | 1-127 | latitude: 37.275 to 37.294 longitude: −121.934 to −121.913 | San Jose, CA |
| 12346 | 128-255 | latitude: 37.303 to 37.331 longitude: −121.861 to −121.834 | San Jose, CA |
| . . . | | | |

For example, the address-range-to-location mapping for 38.104.134.176-190, described above, may be stored in the data pack depicted by Table 3 and 4. The non-range portion of the address-range-to-location mapping, 38.104.134, is stored in Index Table, Table3, along with pointer information to Data Table. The pointer information includes Data Table Index value "12345" and the number of rows in Data Table corresponding to this range: Row Count, "5." The range portion with the mapping to the geographic area and locality is stored in Data Table, Table 4 along with the index for retrieval the non-range portion.

Processing a Location-Query Based on a Data Pack

In an embodiment, a location-query may be processed based on information in a data pack. The address of a location-query may be divided into two portions. The first portion of the address may correspond to non-range portions stored in the index table of the data pack, and the second portion may correspond to range portions stored in the data table of the data pack. Based on the first portion, the index table row that corresponds to the matching non-range portion is returned from the data pack.

The returned index table row may provide the pointer information to retrieve ranges corresponding to the first portion of the address. Based on matching the second portion to a range from the retrieved ranges, the locations corresponding to the range may be returned from the data table for the location-query. In a related embodiment, the pointer information may include a data table index value and a data table row count. Using the data table index value, number of rows from the data table matching the data table row count are retrieved. The ranges in those rows may be matched with the second portion of the address in the location-query. If the second portion of the address is within any of the returned ranges, then the corresponding locations is returned from the retrieved data table rows as the geographic area and locality for the location-query.

For example, a location-query is received from a location-unaware application from an address 38.104.134.183. Using data pack described in Table 3 and 4, geographic area and geographic locality for the location-query may be returned. The 24 bit subnet address portion of the address, 38.104.134, is used to retrieve pointer information from Index Table, Table 3. The pointer information includes a data table index value, 12345, and a data table row count, 4. Using the data table index value, 12345, each row from Data Table, Table 3 that has a matching value in Index Column to the data table index value, is retrieved. The non-subnet portion of the address, 183, is compared with ranges in Range column of the retrieved rows until the number of rows compared reaches the data table row count. The row with the Index value 12345 and Range value 176-190 is matched because 183 falls within the range 176-190 for the specified index value. The corresponding geographic area in Geographic Area column, latitude: 37.3310 to 37.3338 and longitude: −121.8952 to −121.8948, and the corresponding geographic locality in Geographic Locality column, 95128, are returned from the matched row for the location-query from address 38.104.134.183.

AGS Operational Example

Accordingly, AGS may receive mapping information from a location-aware application, such as a weather application, where users of the weather application have entered their locations to receive weather information, in an embodiment. The weather application may have also retrieved the addresses of those users and stored it along with the entered locations. Then, the weather application may provide this mapping information to AGS. AGS may process these mapping information according to the embodiments described herein and generate address-range-to-location mappings.

A location-unaware application, such as an advertising application, may access AGS to retrieve location information for a user to provide the user with location-relevant advertising, in an embodiment. The advertising application may specify the address of the user to internet locations system. Internet locations system would query address-range-to-location mappings that the system has produced from location-aware applications such as the weather application. If the user address falls within any of the address-range-to-location mappings, internet locations system may return the locations of the matched address-range-to-location mapping to the advertising application. With the user locations, the advertising application may provide the user with location-relevant advertising, and thus improve the application's user experience.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
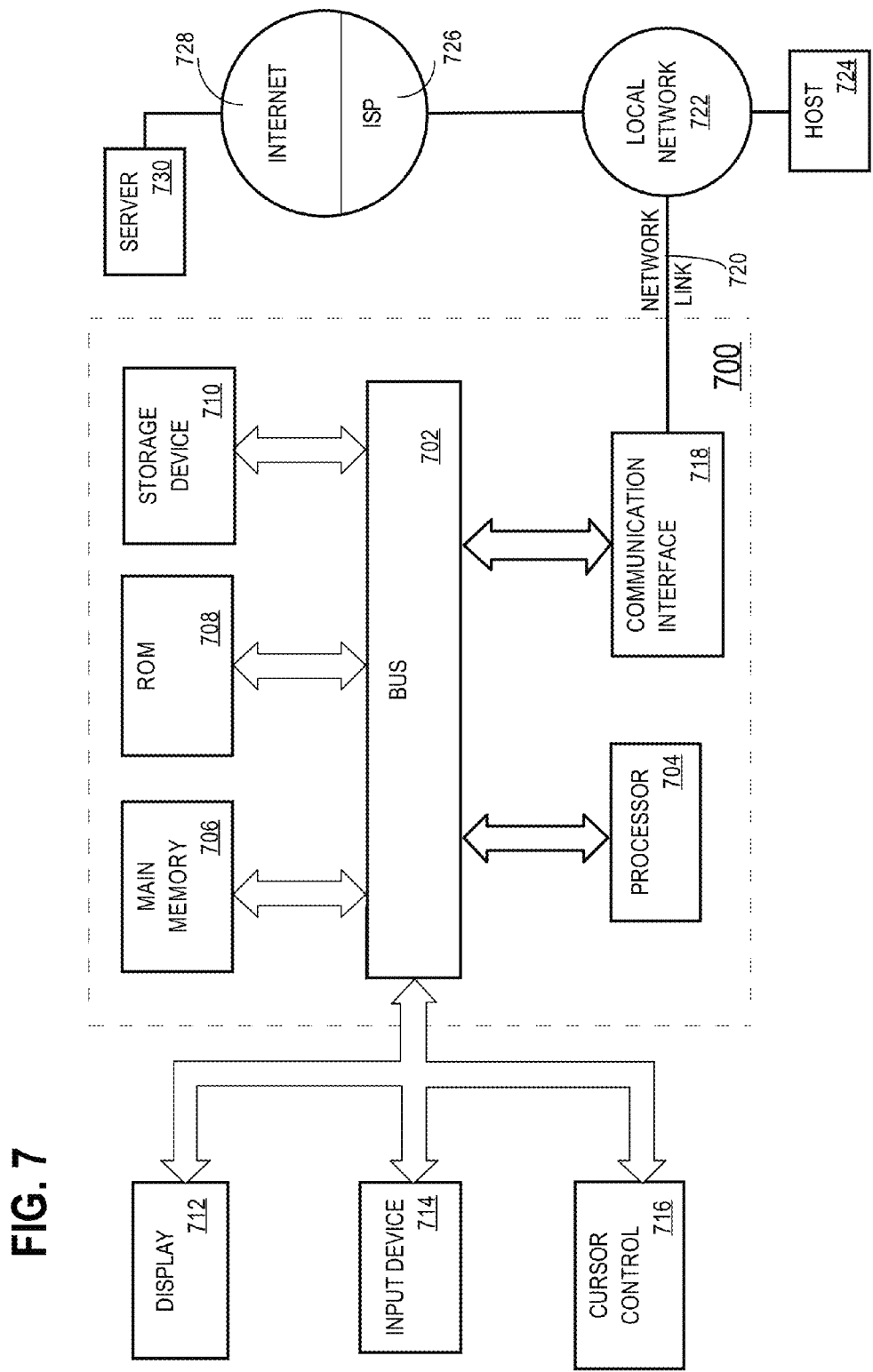
FIG. 7 is a block diagram that illustrates a computer system upon which an embodiment of the invention may be implemented.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk, optical disk, or solid-state drive is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 710. Volatile media includes dynamic memory, such as main memory 706. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid-state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method comprising:
    generating a set of address-to-location mappings by performing the following steps for each of a plurality of network addresses:
        receiving information about a plurality of location-known requests that originated from one or more requesting devices,
        wherein, when each location-known request of the plurality of location-known requests was sent, the requesting device that sent the location-known request was uniquely identified by a network address,
        wherein the information indicates a plurality of distinct locations associated with the network address,
        identifying a geographical area based, at least in part, on the plurality of distinct locations,
        mapping the geographical area to at least one geographical locality, and
        generating an address-to-location mapping that associates the network address with the at least one geographical locality; and
    generating a plurality of address-range-to-location mappings by combining address-to-location mappings, from the set of address-to-location mappings, based on:
        addresses specified in the address-to-location mappings, and
        locations specified in the address-to-location mappings.

2. The method in claim 1, further comprising:
    receiving a location-unknown request that originated from a particular network address, wherein the location-unknown request is not associated with any location information; and
    determining location-relevant information for the location-unknown request based, at least in part, on the particular network address and the set of address-to-location mappings.

3. The method of claim 1, wherein the step of identifying a geographical area includes:
    determining a first subset of the plurality of distinct locations that qualify as outliers;
    wherein a second subset of the plurality of distinct locations do not qualify as outliers; and
    identifying the geographical area that encompasses the second subset of the plurality of distinct locations and does not encompass the first subset of the plurality of distinct locations.

4. The method in claim 3, wherein the geographical area is based on a minimum longitude coordinate, a maximum longitude coordinate, a minimum latitude coordinate, and a maximum latitude coordinate, determined based on the second subset of locations.

5. The method in claim 1, further comprising:
    sorting the set of address-to-location mappings based on network addresses;
    comparing locations in an adjoining subset address-to-location mappings from the set of address-to-location mappings;
    based, at least in part, on proximity of the locations, combining the adjoining subset of address-to-location mappings into an address-to-range mapping.

6. The method in claim 5, wherein the adjoining subset of address-to-location mappings includes network addresses that share a subnet.

7. The method in claim 2, wherein the step of determining location information for the request comprises:
    based on a prefix of the particular network address, selecting an index entry in an index table;
    retrieving index data from the index entry in the index table, wherein the index data indicates an offset into a data table;
    starting at an initial entry indicated by the offset into the data table, selecting each data entry from the data table that is subsequent to the initial entry;
    comparing data in the data entry to the particular network address;
    if the particular network address is within a range indicated in the data, then selecting location information indicated by the data.

8. The method of claim 7, wherein
    the index entry comprises a count that indicates a number of the data entries that exists for the particular network addresses with said prefix; and
    the step of selecting the data entries includes ceasing to select after selecting the number of data entries that exceeds the count.

9. The method in claim 3, wherein the step of identifying a geographical area further comprises:
- determining a central location from the plurality of distinct locations;
- calculating distances between the plurality of distinct locations to the central location; and
- identifying the second subset of the plurality of distinct locations based on the distances.

10. The method in claim 9, wherein each location in the plurality of distinct locations is represented by a longitude coordinate and a latitude coordinate, and the central location has a longitude coordinate equal to an average of longitude coordinates of the plurality of distinct locations and has a latitude coordinate equal to an average of latitude coordinates of the plurality of distinct locations.

11. The method of claim 9, wherein the step of identifying the second subset of the plurality of distinct locations further comprises:
- calculating a mean distance by averaging the distances from the central location;
- calculating a standard deviation of the distances from the central location;
- calculating a preferred distance based on the mean distance and the standard deviation; and
- identifying the second subset of the plurality of distinct locations that are within the preferred distance from the central location.

12. The method in claim 1, wherein:
- the plurality of location-known requests further comprise of a timestamp associated with each location; and
- the step of generating address-to-location mappings uses a subset of the plurality of location-known requests, wherein each particular location-known request in the subset has a timestamp that is within a particular time period.

13. The method in claim 2, wherein the location-known request originates from a first set of applications to which users have granted permission to access location information; and
- the location-unknown request originates from a second set of applications, to which users have not granted permission to access location information.

14. The method in claim 2, wherein the location-unknown request is from a certain network address that does not match any network address within the set of address-to-location mappings.

15. One or more non-transitory storage media storing instructions which, when executed by one or more computing devices, cause performance of a method comprising:
- generating a set of address-to-location mappings by performing the following steps for each of a plurality of network addresses:
  - receiving information about a plurality of location-known requests that originated from one or more requesting devices,
  - wherein, when each location-known request of the plurality of location-known requests was sent, the requesting device that sent the location-known request was uniquely identified by a network address,
  - wherein the information indicates a plurality of distinct locations associated with the network address,
  - identifying a geographical area based, at least in part, on the plurality of distinct locations,
  - mapping the geographical area to at least one geographical locality, and
  - generating an address-to-location mapping that associates the network address with the at least one geographical locality; and
- generating a plurality of address-range-to-location mappings by combining address-to-location mappings, from the set of address-to-location mappings, based on:
  - addresses specified in the address-to-location mappings, and
  - locations specified in the address-to-location mappings.

16. The one or more non-transitory storage media storing instructions of claim 15, wherein the method further comprises:
- receiving a location-unknown request that originated from a particular network address, wherein the location-unknown request is not associated with any location information; and
- determining location-relevant information for the location-unknown request based, at least in part, on the particular network address and the set of address-to-location mappings.

17. The one or more non-transitory storage media storing instructions of claim 15, wherein the step of identifying a geographical area includes:
- determining a first subset of the plurality of distinct locations that qualify as outliers;
- wherein a second subset of the plurality of distinct locations do not qualify as outliers; and
- identifying the geographical area that encompasses the second subset of the plurality of distinct locations and does not encompass the first subset of the plurality of distinct locations.

18. The one or more non-transitory storage media storing instructions of claim 17, wherein the geographical area is based on a minimum longitude coordinate, a maximum longitude coordinate, a minimum latitude coordinate, and a maximum latitude coordinate, determined based on the second subset of locations.

19. The one or more non-transitory storage media storing instructions of claim 15, wherein the method further comprises:
- sorting the set of address-to-location mappings based on network addresses;
- comparing locations in an adjoining subset address-to-location mappings from the set of address-to-location mappings;
- based, at least in part, on proximity of the locations, combining the adjoining subset of address-to-location mappings into an address-to-range mapping.

20. The one or more non-transitory storage media storing instructions of claim 19, wherein the adjoining subset of address-to-location mappings includes network addresses that share a subnet.

21. The one or more non-transitory storage media storing instructions of claim 16, wherein the step of determining location information for the request comprises:
- based on a prefix of the particular network address, selecting an index entry in an index table;
- retrieving index data from the index entry in the index table, wherein the index data indicates an offset into a data table;
- starting at an initial entry indicated by the offset into the data table, selecting each data entry from the data table that is subsequent to the initial entry;
- comparing data in the data entry to the particular network address;

if the particular network address is within a range indicated in the data, then selecting location information indicated by the data.

22. The one or more non-transitory storage media storing instructions of claim 21, wherein
the index entry comprises a count that indicates a number of the data entries that exists for the particular network addresses with said prefix; and
the step of selecting the data entries includes ceasing to select after selecting the number of data entries that exceeds the count.

23. The one or more non-transitory storage media storing instructions of claim 17, wherein the step of identifying a geographical area further comprises:
determining a central location from the plurality of distinct locations;
calculating distances between the plurality of distinct locations to the central location; and
identifying the second subset of the plurality of distinct locations based on the distances.

24. The one or more non-transitory storage media storing instructions of claim 23, wherein each location in the plurality of distinct locations is represented by a longitude coordinate and a latitude coordinate, and the central location has a longitude coordinate equal to an average of longitude coordinates of the plurality of distinct locations and has a latitude coordinate equal to an average of latitude coordinates of the plurality of distinct locations.

25. The one or more non-transitory storage media storing instructions of claim 23, wherein the step of identifying the second subset of the plurality of distinct locations further comprises:
calculating a mean distance by averaging the distances from the central location;
calculating a standard deviation of the distances from the central location;
calculating a preferred distance based on the mean distance and the standard deviation; and
identifying the second subset of the plurality of distinct locations that are within the preferred distance from the central location.

26. The one or more non-transitory storage media storing instructions of claim 15, wherein:
the plurality of location-known requests further comprise of a timestamp associated with each location; and
the step of generating address-to-location mappings uses a subset of the plurality of location-known requests, wherein each particular location-known request in the subset has a timestamp that is within a particular time period.

27. The one or more non-transitory storage media storing instructions of claim 16, wherein the location-known request originates from a first set of applications to which users have granted permission to access location information; and
the location-unknown request originates from a second set of applications, to which users have not granted permission to access location information.

28. The one or more non-transitory storage media storing instructions of claim 16, wherein the location-unknown request is from a certain network address that does not match any network address within the set of address-to-location mappings.

* * * * *